US012662412B2

(12) United States Patent (10) Patent No.: US 12,662,412 B2
Amadon et al. (45) Date of Patent: Jun. 23, 2026

(54) SYSTEMS AND METHODS FOR PROCESSING THIN GLASS RIBBONS

(71) Applicant: CORNING INCORPORATED, Corning, NY (US)

(72) Inventors: Jeffrey Robert Amadon, Lexington, KY (US); Antoine Gaston Denis Bisson, Painted Post, NY (US); Norman Bradley Dunning, Salvisa, KY (US); Romain Jeanson, Fleury en Biere (FR); Rohit Rai, Painted Post, NY (US); Seung Hee Won, Asan-si (KR)

(73) Assignee: CORNING INCORPORATED, Corning, NY (US)

( * ) Notice: Subject to any disclaimer, the term of this patent is extended or adjusted under 35 U.S.C. 154(b) by 193 days.

(21) Appl. No.: 18/479,331

(22) Filed: Oct. 2, 2023

(65) Prior Publication Data

US 2024/0025791 A1 Jan. 25, 2024

Related U.S. Application Data

(62) Division of application No. 16/760,764, filed as application No. PCT/US2018/058112 on Oct. 30, 2018, now Pat. No. 11,802,069.

(Continued)

(51) Int. Cl.
*C03B 35/16* (2006.01)
*B65H 20/02* (2006.01)
(Continued)

(52) U.S. Cl.
CPC ........... *C03B 35/161* (2013.01); *B65H 20/02* (2013.01); *B65H 23/32* (2013.01); *C03B 23/023* (2013.01);
(Continued)

(58) Field of Classification Search
CPC ...... C03B 33/0235; B65H 20/02; B65H 23/32
See application file for complete search history.

(56) References Cited

U.S. PATENT DOCUMENTS 3,433,613 A 3/1969 Dockerty
7,614,305 B2 11/2009 Yoshioka et al.
(Continued)

FOREIGN PATENT DOCUMENTS

CN 1791542 A 6/2006
CN 103204619 A 7/2013
(Continued)

OTHER PUBLICATIONS

Chinese Patent Application No. 201880076062.7, Office Action dated Jul. 5, 2021, 15 pages (10 pages of English Translation and 5 pages of Original Document), Chinese Patent Office.
(Continued)

*Primary Examiner* — Erin Snelting
*Assistant Examiner* — Steven S Lee
(74) *Attorney, Agent, or Firm* — Matthew J. Mason

(57) ABSTRACT

Systems, apparatuses and methods for processing a glass ribbon. A glass ribbon is supplied to an upstream side of a conveying apparatus comprising a conveyor device and a pulling device. The conveyor device establishes a primary plane of travel from the upstream side to a downstream side. The pulling device is located at the downstream side and applies a pulling force on the glass ribbon to convey the glass ribbon along a travel path that includes first, second and third bends, and into the primary plane of travel from a location downstream of the third bend and to the pulling device. At least one of the first, second, and third bends imparts a stress into a surface of the glass ribbon to flatten
(Continued)

the glass ribbon. A viscosity of the glass ribbon at the third bend is greater than a viscosity of the glass ribbon at the first bend.

12 Claims, 9 Drawing Sheets

Related U.S. Application Data

(60) Provisional application No. 62/578,816, filed on Oct. 30, 2017.

(51) Int. Cl.
  B65H 23/32 (2006.01)
  C03B 23/023 (2006.01)

(52) U.S. Cl.
  CPC ............... *B65H 2404/1526* (2013.01); *B65H 2404/1541* (2013.01)

(56) References Cited

U.S. PATENT DOCUMENTS

| | | | |
|---|---|---|---|
| 8,020,447 | B2 | 9/2011 | Okuda et al. |
| 8,119,999 | B2 | 2/2012 | Choju et al. |
| 8,359,887 | B2 | 1/2013 | Bisson et al. |
| 9,038,414 | B2 | 5/2015 | Fleming et al. |
| 9,790,121 | B2 | 10/2017 | Abramov et al. |
| 2005/0103054 | A1 | 5/2005 | Shiraishi et al. |
| 2005/0178159 | A1 | 8/2005 | Shiraishi et al. |
| 2006/0010915 | A1 | 1/2006 | Greulich-Hickmann et al. |
| 2012/0111054 | A1* | 5/2012 | Blanding ........... B65H 23/0322 65/106 |
| 2012/0159989 | A1 | 6/2012 | Shiraishi et al. |
| 2012/0247154 | A1 | 10/2012 | Abramov et al. |
| 2012/0304695 | A1 | 12/2012 | Lakota et al. |
| 2013/0047671 | A1 | 2/2013 | Kohli |
| 2013/0047971 | A1 | 2/2013 | Jolley et al. |
| 2014/0017475 | A1 | 1/2014 | Teranishi et al. |
| 2014/0130649 | A1* | 5/2014 | Chang ................... C03B 33/033 83/26 |
| 2014/0283554 | A1 | 9/2014 | Fredholm |
| 2015/0099618 | A1* | 4/2015 | Bisson ................. C03B 17/061 65/25.2 |
| 2015/0259236 | A1 | 9/2015 | Marshall et al. |
| 2015/0315059 | A1* | 11/2015 | Abramov ........... C03B 23/0235 65/176 |
| 2016/0168003 | A1 | 6/2016 | Hasegawa et al. |
| 2017/0073264 | A1 | 3/2017 | Lotze et al. |
| 2017/0157917 | A1 | 6/2017 | Young |

FOREIGN PATENT DOCUMENTS

| | | |
|---|---|---|
| CN | 203512116 U | 4/2014 |
| CN | 104520218 A | 4/2015 |
| CN | 105189378 A | 12/2015 |
| CN | 106919003 A | 7/2017 |
| CN | 107098576 A | 8/2017 |
| EP | 2065345 A1 | 6/2009 |
| EP | 2772471 A1 | 9/2014 |
| JP | 04-367532 A | 12/1992 |
| JP | 11-139837 A | 5/1999 |
| JP | 2001-180949 A | 7/2001 |
| JP | 2002-047019 A | 2/2002 |
| JP | 2002-047020 A | 2/2002 |
| JP | 2002-249329 A | 9/2002 |
| JP | 2004-026534 A | 1/2004 |
| JP | 2006-028008 A | 2/2006 |
| JP | 4367533 B2 | 11/2009 |
| JP | 4367534 B2 | 11/2009 |
| JP | 2010-235357 A | 10/2010 |
| JP | 2012-096989 A | 5/2012 |
| JP | 2012-144435 A | 8/2012 |
| JP | 2012-211074 A | 11/2012 |
| JP | 2014-152046 A | 8/2014 |
| JP | 2015-044712 A | 3/2015 |
| JP | 2015-063419 A | 4/2015 |
| JP | 2015-131731 A | 7/2015 |
| JP | 2015-532910 A | 11/2015 |
| JP | 6125572 B2 | 5/2017 |
| JP | 2017-154886 A | 9/2017 |
| KR | 10-2015-0083112 A | 7/2015 |
| TW | 201228959 A | 7/2012 |
| TW | 201315697 A | 4/2013 |
| TW | 1548599 B | 9/2016 |
| WO | 2012/166761 A1 | 12/2012 |
| WO | WO-2012176594 A1 * | 12/2012 ........... B65H 18/103 |
| WO | WO-2014051984 A1 * | 4/2014 ......... C03B 33/0215 |
| WO | WO-2015029669 A1 * | 3/2015 ........... C03B 33/091 |
| WO | 2016/007448 A1 | 1/2016 |
| WO | 2016/123000 A1 | 8/2016 |
| WO | WO-2016141005 A1 * | 9/2016 ............. B65H 18/08 |
| WO | 2016/187172 A1 | 11/2016 |
| WO | 2016/187190 A1 | 11/2016 |
| WO | 2017/161104 A1 | 9/2017 |

OTHER PUBLICATIONS

European Patent Application No. 18801229 Office Action dated Aug. 18, 2021; 8 Pages; European Patent Office.

International Search Report and Written Opinion of the International Searching Authority; PCT/US2018/058112; Mailed Mar. 28, 2019; 22 Pages; European Patent Office.

Japanese Patent Application No. 2020-543262, Office Action dated Aug. 30, 2022, 10 pages (5 pages of English Translation and 5 pages of Original Document), Japanese Patent Office.

Nikkan Kogyo Shimbun, New Glass Forum Written and Edited , Carry Out Main Science Science of Glass , Carry Out Main, Science of Science Glass, , Jun. 25, 2013, 3 pages.

Taiwanese Patent Application No. 107138321, Office Action, dated Jul. 5, 2022, 1 page; Taiwanese Patent Office.

* cited by examiner

150

256

212

250

240

190

258

220

SYSTEMS AND METHODS FOR PROCESSING THIN GLASS RIBBONS

CROSS-REFERENCE TO RELATED APPLICATIONS

This application is a divisional of U.S. patent application Ser. No. 16/760,764 filed on Oct. 30, 2018, which claims the benefit of priority under 35 U.S.C. § 119 of U.S. Provisional Application Ser. No. 62/578,816 filed on Oct. 30, 2017, the content of which is relied upon and incorporated herein by reference in its entirety.

BACKGROUND

Field

The present disclosure generally relates to systems and methods for processing a glass ribbon. More particularly, it relates to systems and methods for handling a glass ribbon as part of the manufacture of thin glass sheets from a moving glass ribbon.

Technical Background

Production of glass sheets typically involves producing a glass ribbon from a molten glass material, and then cutting or separating individual glass sheets from the glass ribbon. Various techniques are known for producing the glass ribbon. For example, with a down-draw process (e.g., fusion draw process), the ribbon is drawn downward, typically from a forming body. Other glass making processes include, for example, float, up-draw, slot-style and Fourcault's-style processes. In yet other examples, the glass ribbon can be temporarily stored in roll form, and later unwound for subsequent cutting or separation of individual glass sheets.

To meet the demands of many end use applications, continuing efforts have been made to produce thinner glass sheets (e.g., about 1 millimeter (mm) or less). As the thickness of the glass ribbons from which the glass sheets are formed becomes thinner, they are also more susceptible warp (or flatness deviations) and other concerns (such as surface damage that may be imparted during the process steps to provide a thinner glass ribbon). Warp can occur in one or more of the width or length direction of the glass ribbon. The glass production process layout may also contribute to deviations in flatness. For example, with some thin rolled glass formation techniques, the process layout includes a transitioning the glass ribbon from a vertical orientation to a horizontal orientation. During this turn, the glass is still at a viscosity that is low enough to be easily influenced by gravity and some edge effects can induce a noticeable transverse deformation. In the longitudinal direction, a pulling force can be applied to stabilize the glass ribbon by developing a tension. A resulting compressive component then appears on the edges that in turn can generate wrinkles or warp across the width. A flatter glass ribbon reduces the amount of material that may need to be removed, such as by grinding and/or polishing, to achieve a given final thickness. For example, flatness on the order of 100 micrometers (for a sheet size of about 250 mm×600 mm) may be necessary for some applications.

As a point of reference, during the glass forming process, a glass ribbon is first formed in a viscous state, and is then cooled to a viscoelastic state and finally to an elastic state. The common practice to minimize warp is to pass the glass ribbon through nip rolls at a location close to the end of the purely viscous regime. Nip rolls are cylindrical and can be set at a fixed gap or at a fixed pinch force. Typically one of the two nip rolls is driven and the other is idle to apply a desired force. Regardless, the mechanical effect applied to the glass ribbon by the nip rolls is essentially unidirectional (a "squeezing" effect) and characterized as a short line or linear mode of contact. For some end use applications, the linear contact applied by the nip rolls alone cannot achieve a desired level of flatness.

Accordingly, systems and methods for processing a glass ribbon, for example reducing warp in a glass ribbon, are disclosed herein.

SUMMARY

Some embodiments of the present disclosure relate to a method for processing a glass ribbon. A glass ribbon is supplied from a supply apparatus to an upstream side of a conveying apparatus. The conveying apparatus comprises a conveyor device and a pulling device. The pulling device is located at a downstream side of the conveying apparatus opposite the upstream side. The conveyor device establishes a primary plane of travel from the upstream side to the downstream side. A pulling force is applied on the glass ribbon and the glass ribbon is continuously conveyed along a travel path. In this regard, the travel path includes first, second and third bends. The first bend is formed at a first location between the upstream side and the pulling device. The first bend defines a curve that is convex to the primary plane of travel. The second bend is formed at a second location between the first location and the pulling device. The second bend defines a curve that is concave to the primary plane of travel. The third bend is formed at a third location between the second location and the pulling device. The third bend defines a curve that is convex to the primary plane of travel. A vertical distance between the third location and the primary plane of travel is greater that a vertical distance between the first location and the primary plane of travel. The travel path further includes in the primary plane of travel from a location downstream of the third location and to the pulling device. At least one of the first, second, and third bends imparts a stress into a surface of the glass ribbon to flatten the glass ribbon. In some embodiments, a viscosity of the glass ribbon at the third bend is greater than a viscosity of the glass ribbon at the first bend. In other embodiments, at least one of the first, second and third bends is cause, at least in part, by an interface between the glass ribbon and a bending tool along with gravity.

Yet other embodiments of the present disclosure relate to a system for processing a glass ribbon. The system comprises a conveying apparatus. The conveying apparatus comprises a conveyor device, a pulling device, a first bending tool, a second bending tool, and a third bending tool. The conveyor device establishes a primary plane of travel from an upstream side to a downstream side. The pulling device is located at the downstream side for conveying a glass ribbon along a travel path. The first bending tool is proximate the upstream side. The second bending tool is between the first bending tool and the downstream side. A vertical distance between the second bending tool and the primary plane of travel is greater than a vertical distance between the first bending tool and the primary plane of travel. The third bending tool is between the second bending tool and the downstream side. A vertical distance between the third bending tool and the primary plane of travel is greater than the vertical distance between the second bending tool and the primary plane of travel. The first, second and third bending tools, at least in part, establish the travel path as comprising first, second and third bends. The first bend is formed at a first location between the upstream side and the pulling device. The first bend defines a curve that is convex to the primary plane of travel. The second bend is formed at a second location between the first location and the pulling device. The second bend defines a curve that is concave to the primary plane of travel. The third bend is formed at a third location between the second location and the pulling device. The third bend defines a curve that is convex to the primary plane of travel. The travel path further includes in the primary plane of travel from a location downstream of the third location and to the pulling device. In some embodiments, the first, second and third bending tools are configured to establish line contact with the glass ribbon.

Yet other embodiments of the present disclosure relate to a bending tool assembly for processing a glass ribbon. The bending tool assembly comprises an upstream bending tool, a downstream bending tool, an upstream support unit, a downstream support unit, and a base unit. The upstream support unit supports opposing ends of the upstream bending tool. The downstream support unit supports opposing ends of the downstream bending tool. The base unit comprises a plate, a first side leg and a second side leg projecting from opposite ends of the plate, a first cross-beam connected to the first side leg, and a second cross-beam connected to the second side leg. The first and second cross-beams support the upstream and downstream support units relative to the plate. Further, the bending tool assembly is configured such that at least one of the opposing ends of at least one of the upstream and downstream bending tools is selectively movable relative to the plate.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate various embodiments described herein, and together with the description serve to explain the principles and operations of the claimed subject matter.

DETAILED DESCRIPTION

Figure 1:
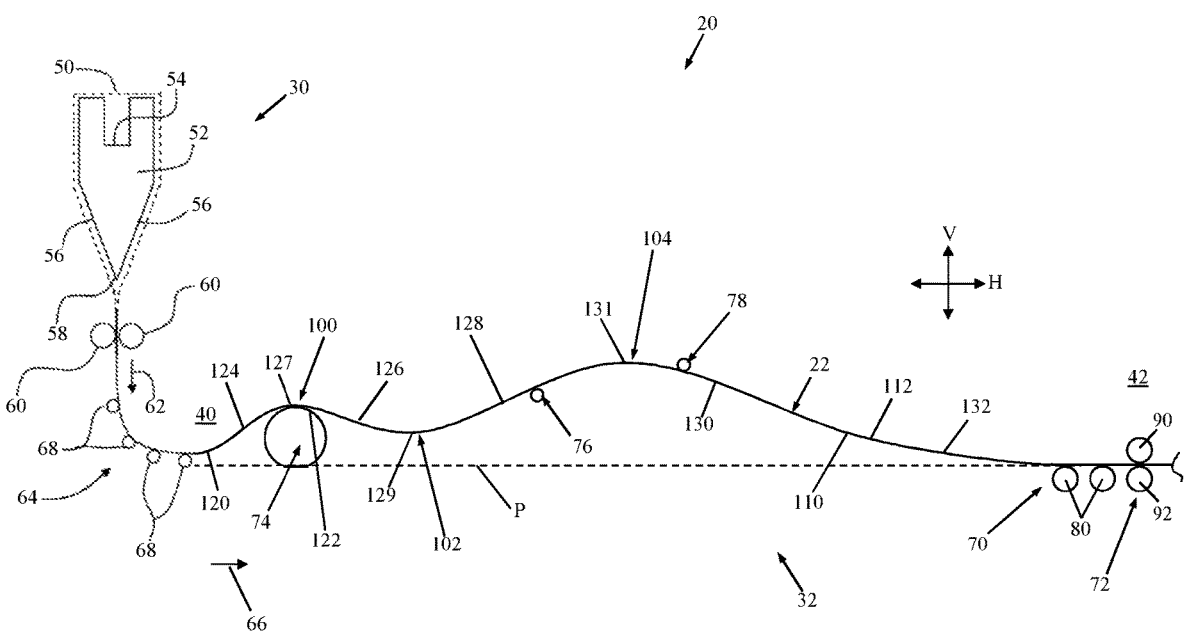
FIG. 1 is a simplified side view of a system for processing a glass ribbon in accordance with principles of the present disclosure.

Reference will now be made in detail to various embodiments of systems and methods for processing a glass ribbon, and in particular for removing warp from, or improving flatness in, a glass ribbon, for example a continuous glass ribbon. Whenever possible, the same reference numerals will be used throughout the drawings to refer to the same or like parts.

Some aspects of the present disclosure provide glass ribbon handling systems and methods in which a continuously conveyed or traveling glass ribbon is subjected to temporary bends at locations along the path of travel in such a way that final flatness is improved. The extent or curvature of the imparted bends and the mechanisms (or bending tools) utilized to achieve the bends can be selected in accordance with an expected viscosity of the glass ribbon as described below so as to generate a stress field that tends to straighten the profile of the glass ribbon across the width. With this in mind, one embodiment of a system 20 in accordance with principles of the present disclosure and useful in forming and processing a glass ribbon 22 is schematically shown in FIG. 1. Although the system 20 is described herein as being used to process a glass ribbon, it should be understood that the systems and methods of the present disclosure can also be used to process other types of materials such as polymers (e.g., Plexi-glass™), metals, or other substrate materials.

The system 20 includes a glass ribbon supply apparatus 30 and a conveying apparatus 32. As described in greater detail below, the glass ribbon supply apparatus 30 can assume a wide variety of forms appropriate for generating and delivering the glass ribbon 22 to an upstream side 40 of the conveying apparatus 32. The conveying apparatus 32 causes the glass ribbon 22 to travel from the upstream side 40 to a downstream side 42. In this regard, the glass ribbon 22 cools and thus experiences an increasing viscosity from the upstream side 40 to the downstream side 42. Further, the conveying apparatus 32 is configured to lessen or remove warp (deviations in flatness) from the glass ribbon 22 as it progresses to the downstream side 42.

In some non-limiting embodiments, the glass ribbon supply apparatus 30 incorporates fusion processes in which molten glass 50 is routed to a forming body 52. The forming body 52 comprises an open channel 54 positioned on an upper surface thereof, and a pair of converging forming surfaces 56 that converge at a bottom or root 58 of the forming body 52. The molten glass 50 flows into the open channel 54 and overflows the walls thereof, thereby separating into two individual flow of molten glass that flow over the converging forming surfaces 56. When the separate flow of molten glass reach the root 58, the recombine, or fuse, to form a single ribbon of viscous molten glass (i.e., the glass ribbon 22) that descends from the root 58. Various rollers 60 contact the viscous glass ribbon 22 along the edges of the ribbon and aid in drawing the ribbon 22 in a first, downward direction 62 (such as a vertical direction). The present disclosure is equally applicable to other variations of down draw glass making processes such as a single sided overflow process or a slot draw process, which basic processes are well known to those skilled in the art.

In some embodiments, the glass ribbon supply apparatus 30 can further include a redirecting device 64 that redirects the glass ribbon 22 from the first direction 62 into a second direction 66 for delivery to the conveying apparatus 32. The redirecting device 64 is represented in FIG. 1 by rollers 68. In some embodiments, the glass ribbon 22 is turned by the redirecting device 64 through an angle of 90 degrees and the second direction 66 is horizontal. In some embodiments, the redirecting device 64 does not physically contact the glass ribbon 22 (e.g., air bearings), or, in the event that contact is necessary, such as when rollers are used, contact can be limited to the edge portions of the glass ribbon 22.

Other glass ribbon formation techniques are also acceptable that may or may not include the 90 degree turn described above, may or may not incorporate fusion processes, etc. Regardless, the molten, viscous glass ribbon 22 is continuously supplied to the upstream side 40 of the conveying apparatus 32.

The conveying apparatus 32 includes a conveyor device 70 (referenced generally), a pulling device 72 and one or more bending tools, such as bending tools 74, 76, 78. In general terms, the conveyor device 70 establishes a primary plane of travel P from the upstream side 40 to the downstream side 42. The pulling device 72 is located at or immediately proximate the downstream side 42, and exerts a pulling force onto the glass ribbon 22 and continuously conveys the glass ribbon 22 along a travel path defined, at least in part, by the bending tools 74, 76, 78 as described below.

The conveyor device 70 can assume various forms appropriate for supporting the glass ribbon 22 and can include transport devices, such as rollers 80. The rollers 80 can have any format appropriate for interfacing with (e.g., contacting) the glass ribbon. For example, the rollers 80 can each comprise or exhibit a material, stiffness, surface coating, etc., appropriate for directly contacting the glass ribbon 22 in a manner that does not overtly negatively affect selected properties of the glass ribbon 22. Some or all of the rollers 80 can be driven rollers of a type known to one of ordinary skill. Other conveying formats are also acceptable, such as a belt conveyor, non-contact conveyor (e.g., air bearing), etc. While FIG. 1 reflects only a few of the rollers 80 immediately adjacent the downstream side 42, in other embodiments, one or more transport devices (e.g., rollers) may be included adjacent the upstream side 40 or between the upstream and downstream sides 40, 42. Regardless, the rollers 80 (or other conveying device arrangement) collectively establish the primary plane of travel P as the vertically lowermost extent at which the conveyor device 70 contacts or otherwise directly interfaces with the glass ribbon 22. In some non-limiting embodiments, the conveyor device 70 is configured for installation to the floor of a glass production facility, and thus can include framework (not shown) supporting the rollers 80 (or other transport devices) as is known in the art.

The pulling device 72 can assume a variety of forms appropriate for driving or pulling the glass ribbon 22, and in some embodiments can be or can include a conventional nip roll device comprising first and second rollers 90, 92. One or both of the rollers 90, 92 can be a driven roller as is known in the art. With these and similar configurations, the pulling device 72 can further include a controller (not shown), for example a computer-like device, programmable logic controller, etc., programmed to control a speed or travel rate of the glass ribbon 22 along the conveying apparatus 32. Other pulling device configurations are also acceptable.

Figure 2:
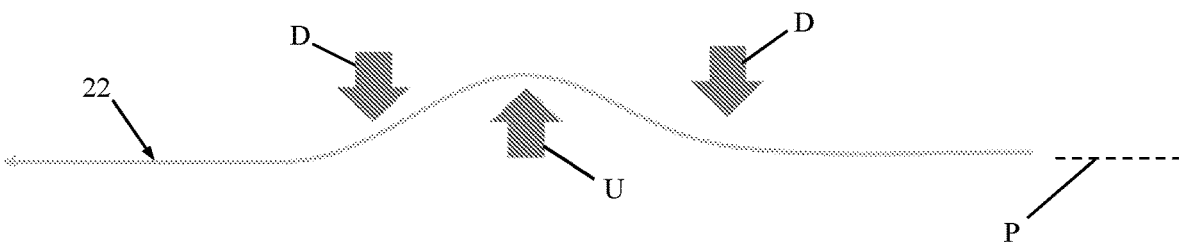
FIG. 2 schematically illustrates imposition of a bend into a traveling glass ribbon.

With the above general parameters of the conveyor device 70 and the pulling device 72 in mind, the bending tool(s) 74, 76, 78 can assume various forms and can be located at various positions relative to the primary plane of travel P, the upstream side 40 and the downstream side 42 for interfacing with the glass ribbon 22 in the manners described below. In more general terms, an arrangement and configuration of the bending tool(s) 74, 76, 78 included in the conveying apparatus 32 are selected to subject the glass ribbon 22 to a succession of temporary bends that serve to reduce the warp components in the glass ribbon 22, while minimizing direct contact with the glass ribbon 22. Forces engaged in the bending steps are provided by the pulling force generated at the pulling device 72. As a point of reference, bending of the traveling glass ribbon 22 can be seen as a combination of upward force(s) U and downward force(s) D, as generally reflected by FIG. 2. The upward force U component can be provided by a physical means that drives the glass ribbon 22 to a position higher than the primary plane of travel P. This physical means can be a solid surface (static or in rotation) with or without an air bearing, leading to an interaction that can be friction, rolling or non-contact. The downward force D component can be provided by gravity when a viscosity of the glass ribbon 22 is sufficiently low, or by the use of a mechanical means that forces the glass ribbon 22 to a lower position. Regardless, the bending generates a surface stress field that tends to straighten or flatten the profile of the glass ribbon 22 across the width (as opposed to a linear force as otherwise effectuated by a nip roll).

Figure 3:
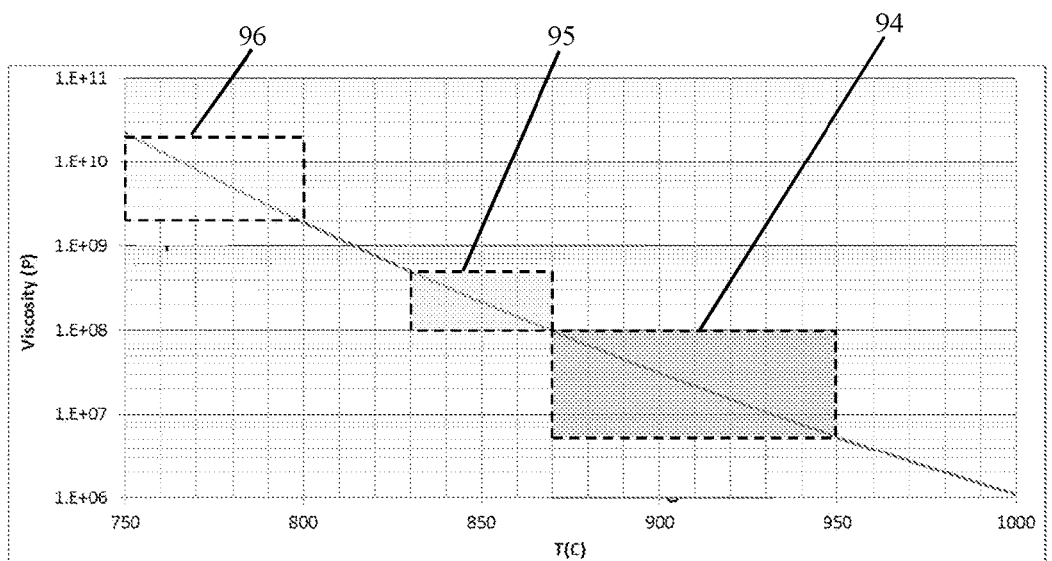
FIG. 3 is a graph of a typical glass viscosity curve in which areas for flattening are designated.

Returning to FIG. 1, and as mentioned above, the conveying apparatus 32 is configured to produce each of the series of flatness-improving bends at locations along the travel path as a function of expected viscosity of the glass ribbon 22. In this regard, the glass ribbon 22 cools while traveling from the upstream side 40 to the downstream side 42; thus, a viscosity of the glass ribbon 22 progressively increases from the upstream side 40 to the downstream side 42. The addition of curvature changes, when done at an appropriate viscosity, can provide significant improvement of the initial shape. If curvature changes are done at a viscosity that is too low, local shearing can occur that may undesirably modify a thickness of the glass ribbon 22. If curvature changes are done at too high a viscosity, the local stresses generated within the glass ribbon 22 during the successive bending may not be sufficient to fully flatten or remove warp. A configuration of the conveying apparatus 32 is based upon these constraints, as well to utilize gravity as a bending force component where viable. As a point of reference, FIG. 3 illustrates an example viscosity curve (as a function of temperature). A region 94 along the viscosity curve where gravity-induced bending in accordance with principles of the present disclosure is beneficial is identified, as is a region 95 where forced bending (e.g., bending caused or imparted at least in part by a force applied to the glass ribbon by an interface with a structure) in accordance with principles of the present disclosure. At region 96, nip roller flattening can be appropriate. It has surprisingly been found that at regions where the glass ribbon 22 has a viscosity in the range of about $10^6$-$10^8$ Poise, gravity-driven bending is viable; and at regions where the glass ribbon 22 has a viscosity in the range of about $10^8$-$10^9$ Poise, forced bending is appropriate (for a glass ribbon thickness on the order of 1 mm and velocity of 10-12 m/min). In some embodiments, other viscosity/bending technique relationships are also acceptable.

Returning to FIG. 1, and with the above general background in mind, the conveying apparatus 32 is configured to produce one or more bends (e.g., change in direction relative to the primary plane of travel P) along the travel path of the glass ribbon 22, such as a first bend 100, a second bend 102, and a third bend 104. One or more (including all) of the bends 100-104 can induce surface stresses in the glass ribbon 22 that remove warp in the glass ribbon 22. The bends 100-104 are created by an interface of the glass ribbon 22 with one or more of the bending tools 74, 76, 78, along with gravity and the pulling force applied by the pulling device 72.

To provide a better understanding of the locations of bending tools 74, 76, 78 and of the bends 100-104 relative to one another, orthogonal vertical V and horizontal H directions are designated in FIG. 1. The vertical direction V can be perpendicular to the primary plane of travel P, and the horizontal direction H can be parallel with the primary plane of travel P. In the descriptions below, "vertical" and "vertically" are in reference to the vertical direction V; "horizontal", "horizontally", "upstream" and "downstream" are in reference to the horizontal direction H. Further, opposing, first and second major faces 110, 112 of the glass ribbon 22 are identified in FIG. 1.

The travel path of the glass ribbon 22 relative to the conveying apparatus 32 initiates at the upstream side 40 at an upstream location 120 that is in or closely proximate the primary plane of travel P. The first bending tool 74 is located proximate, but downstream of, the upstream location 120, and provides a bearing surface 122 (referenced generally, such as a physical surface, an air bearing, etc.) positioned vertically above the primary plane of travel P (and vertically above the upstream location 120). A location of the first bending tool 74 relative to the upstream side 40 is further correlated with an expected viscosity of the glass ribbon 22; the first bending tool 74 is positioned to interface with first major face 110 of the glass ribbon 22 at a point where a viscosity of the glass ribbon 22 is conducive to gravity-induced bending. With this arrangement, the first bending tool 74 and gravity force the first bend 100 into the glass ribbon 22 as the glass ribbon 22 progresses from the upstream location 120 to the bearing surface 122, and then beyond (downstream of) the bearing surface 122. The glass ribbon 22 can be viewed has having a first segment 124 and a second segment 126 at opposite sides of the first bend 100. Because the interface region 122 is positioned vertically above the upstream location 120, the first segment 124 progresses vertically away from the primary plane of travel P from the upstream location 120 to the bearing surface 122. As the glass ribbon 22 travels beyond the bearing surface 122, gravity causes the second segment 124 to progress vertically toward the primary plane of travel P from the first bend 100. The first bend 100 is a curvature in the glass ribbon 22 between the first and second segments 124, 126, and has an apex 127 (i.e., the apex is where a slope of the curve of the first bend 100 is zero). The curve provided by the first bend 100 is convex relative to the primary plane of travel P.

The second bend 102 is formed downstream of the first bend 100, and is produced by gravity and a location of at least the second bending tool 76. In particular, the second bending tool 76 is positioned vertically above, and horizontally downstream of, the interface region 122 of the first bending tool 74. A location of the second bending tool 76 is further correlated with an expected viscosity of the glass ribbon 22; the second bending tool 76 is positioned to interface with the first major face 110 of the glass ribbon 22 at a point where the viscosity of the glass ribbon 22 has increased (relative the viscosity at the point of interface with the first bending tool 74) to a level at which the glass ribbon 22 is unlikely to experience a substantive bend due solely to the force of gravity. In other words, at the point of interface with the second bending tool 76, a viscosity of the glass ribbon 22 is sufficiently high enough such that the glass ribbon 22 will not simply curve around the second bending tool 76 in a manner similar to interaction of the glass ribbon 22 with the first bending tool 74 described above. However, a distance between the first and second bending tools 74, 76 (both vertically and horizontally) in combination with an expected viscosity of the glass ribbon 22 is such that the second bend 102 will be formed in the glass ribbon 22 (upstream of the second bending tool 76) due to gravity. In other words, a position of the second bending tool 76 and expected viscosity of the glass ribbon 22 is such that the glass ribbon 22 defines the second segment 126 as described above (i.e., vertically toward the primary plane of travel P) and a third segment 128 at opposite sides of the second bend 102. The second bending tool 76 causes third segment 128 to progress vertically away from the primary plane of travel P in traveling from the second bend 102 to the second bending tool 76. The second bend 102 represents a curvature in the glass ribbon 22 between the second and third segments 126, 128, and has an apex 129. The curve established by the second bend 102 is concave relative to the primary plane of travel P. If the viscosity of the glass ribbon 22 too high and/or the second bending tool 76 more closely positioned to the first bending tool 74, the force of gravity alone may not be sufficient to cause the second bend 102 to form. With these explanations in mind, then, the second bending tool 76 is configured and located to support the glass ribbon 22 along the travel path as the glass ribbon 22 progresses toward the third bending tool 78.

The third bend 104 is formed downstream of the second bend 102, and is produced by the third bending tool 78 and gravity. In particular, the third bending tool 78 is positioned vertically above, and horizontally downstream of, the second bending tool 76. A location of the third bending tool 78 is further correlated with an expected viscosity of the glass ribbon 22; the third bending tool 78 is positioned to interface with the second major face 112 of the glass ribbon 22 at a point where the viscosity of the glass ribbon 22 has increased (relative to the viscosity of the glass ribbon 22 at the point of interface with the first bending tool 74) to a level appropriate for forced bending and is unlikely to experience a substantive bend due solely to the force of gravity. In other words, a viscosity of the glass ribbon 22 is sufficiently high that the glass ribbon 22 will not experience local shearing upon contacting a surface (such as the third bending tool 78), but sufficiently low as to readily deform in response to the contact. A position of the third bending tool 78 is correlated with an expected viscosity of the glass ribbon 22 at the point of interface with the third bending tool 78 such that the glass ribbon 22 includes the third segment 128 as described above (i.e., progressing vertically away the primary plane of travel P) and a fourth segment 130 at opposite sides of the third bend 104. The fourth segment 130 progresses vertically toward the primary plane of travel P from the third bend 104. The third bend 104 represents a curvature in the glass ribbon 22 between the third and fourth segments 128, 130, and has an apex 131. The curve establishing the third bend 104 is convex relative to the primary plane of travel P. As a point of reference, absent the third bending tool 78, gravity would likely cause the glass ribbon 22 to eventually deflect from the direction of the third segment 128, gradually curving back toward the primary plane of travel P as the glass ribbon 22 progressed away from the second bending tool 76. The third bending tool 78 is imposed into this natural, gravity-induced path, forcing the glass ribbon 22 to experience a more distinct curve, appropriate for producing the surface stresses described above (e.g., sufficient for removing warp components in the glass ribbon 22). Thus, and as reflected by FIG. 1, the third bend 104 is formed in the glass ribbon 22 such that the apex 131 of the third bend 104 is slightly upstream of the third bending tool 78. That is to say, the glass ribbon 22 does not form a distinct curve at or around the third bending tool 78; rather, the third bending tool 78 is formatted and positioned (relative to the second bending tool 76) so as to impart a deflection into the travel path that, in combination with gravity and viscosity of the glass ribbon 22 at the point of interface with the third bending tool 78, generates the third bend 104 appropriate for removing warp. Regardless, a vertical distance between the primary plane of travel P and the third bend 104 is greater than the vertical distance between the primary plane of travel P and the first bend 100.

The travel path of the glass ribbon 22 continues from the apex 131 of the third bend 104 toward the primary plane of travel P. Adjacent the downstream end 42, the first major face 110 is supported by (e.g., in contact with) the rollers 80. The glass ribbon 22 can lie in the primary plane of travel P along the rollers 80 and at the pulling device 72. In some embodiments, a location of the rollers 80 is correlated with an expected viscosity of the glass ribbon 22 at the point of interface with rollers 80; for example, where a viscosity of the glass ribbon 22 has increased to level appropriate for direct, non-damaging contact with a roller surface.

While the conveying apparatus 32 has been described as including three of the bending tools 74, 76, 78, and as defining the travel path as including three of the bends 100, 102, 104, any other number of bending tools, either lessor or greater, can be acceptable. For example, additional bending tools can be provided to support the glass ribbon 22 along the desired travel path (e.g., akin to the second bending tool 76 as described above). Regardless, the conveying apparatuses of the present disclosure are formatted to form at least one curve or bend in the travel path of the glass ribbon 22 at a location corresponding with an expected viscosity of the glass ribbon 22 at the point of the bend appropriate to generate a surface stress sufficient to remove warp components from the glass ribbon 22. In the case of a viscous membrane (e.g., a viscous glass ribbon), the stress generated by bending is in part used to macroscopically deform the glass ribbon 22 and also to flatten it locally. These stresses are relaxed in a short time, making the local deformation permanent. The glass ribbon 22 experiences this flattening along at least one or more of the bends 100, 102, 104. While the travel path of the glass ribbon 22 from the upstream side 40 to the downstream side 42 has been described as initiating with the convex (relative to the primary plane of travel P) first bend 100, in other embodiments, the travel path from the upstream side can comprise one or more other bends upstream of the first bend 100 (e.g., one or more concave (relative to the primary plane of travel P) bends upstream of the convex first bend 100).

The bending tools utilized with the conveying apparatuses of the present disclosure, such as the bending tools 74, 76, 78, can assume various forms appropriate for interfacing with the glass ribbon 22 as the glass ribbon 22 is conveyed along the travel path in a manner that mechanically produces the warp-reducing bends as described above. In more general terms, the bending tools are configured to establish a line type contact or interface with the glass ribbon 22 with minimal or no thermal effect (i.e., the bending tool does not create a "thermal scar" on the glass ribbon 22). In some embodiments, one or more or all of the bending tools provided with the floor conveying units of the present disclosure, such as one or more of the bending tools 74, 76, 78 can be a static body (e.g., a stationary or non-rotating rod). The static bending tools useful with the floor conveying units and methods of the present disclosure can comprise a high thermal conductivity material to avoid thermal gradient-driven deformations in the glass ribbon 22. In some embodiments, the static-type bending tools incorporate a low coefficient of friction material (or other material configured to have a low friction interface with a glass ribbon) at least at the face intended to interface with the traveling glass ribbon 22 to minimize drag and sticking concerns. For example, the static-type bending tools can comprise or include silicon carbide, graphite, etc., at least at the face intended to interface with the glass ribbon 22. In yet other embodiments, the static-type bending tools can include an air bearing that interfaces with the traveling glass ribbon 22 (e.g., the first bending tool 74 can have an air bearing construction). The air bearing constructions may be used as a bending tool at locations at which moderate forces are appropriate for producing the desired bend or curve in the glass ribbon 22.

In some embodiments, one or more or all of the bending tools provided with the conveying apparatuses of the present disclosure, such as one or more of the bending tools 74, 76, 78, can have a rolling-type construction, such as a roller rotatably supported by a shaft. In some embodiments, the rolling-type bending tools can incorporate a lower thermal conductivity design to promote the low thermal gradient-driven deformation mentioned above. For example, the rolling-type bending tools can comprise or include an alumina material at least at the surface intended to interface with the traveling glass ribbon 22; appropriate alumina bodies (tube, rods, etc.) are readily available, and can handle high temperatures. Other non-limiting examples of materials useful with the rolling-type bending tools include high strength ceramics (e.g., silicon carbide).

In some embodiments, one or more or all of the bending tools provided with the conveying apparatuses of the present disclosure are configured to address possible heat transfer concerns by providing forced circulation around a high thermal conductivity material. These optional constructions may be helpful to smooth thermal gradients and reduce the level of residual stress (in-plane component). For example, the bending tool can be configured such that the glass ribbon 22 travels over a high effusivity body that in turn generates curvature inversions. In related embodiments, one or more or all of the bending tools can be configured to provide heat transfer from both major faces 110, 112 of the glass ribbon 22 to enhance the overall effect.

In some embodiments, one or more or all of the bending tools provided with the conveying apparatuses of the present disclosure, such as one or more or all of the bending tools 74, 76, 78, can incorporate a self-alignment mechanism. As a point of reference, it may be beneficial to produce proper alignment of the bending tool in-line with the principal traveling direction of the glass ribbon 22 to avoid occurrences of compressive/tensile forces onto the glass ribbon 22 that can, in turn, drive out-of-plane deformations. The self-alignment mechanism can assume various forms appropriate for maintaining alignment with the principal traveling direction. For example, a device providing an upstream rotation axis normal to the plane of the glass ribbon 22 can be linked to the bending tool; with this construction, the downstream pulling force (applied by the pulling device 72) generates a moment that aligns the assembly (e.g., akin to a weather vane).

In some embodiments, one or more or all of the bending tools provided with the conveying apparatuses of the present disclosure, such as one or more or all of the bending tools 74, 76, 78, can be configured to provide position adjustability relative to the conveyor system 70, and in particular relative to the primary plane of travel P (vertically and/or horizontally adjustable). As a point of reference, in the case of bending the glass ribbon 22 at high viscosity, the relative position of two successive bending tools along the travel path may need to be controlled within tight tolerances (e.g., within 100 micrometers over distances of 100 mm). The spacing between the two successive bending tools can be greater than about 50 mm (along the glass ribbon travel path) in some embodiments; at shorter distances, a minor misalignment between successive bending tools may generate significant out-of-plane stresses and/or instabilities. Further, parallelism in the glass ribbon between successive bending tools can be beneficial in order to generate a consistent bending radius across the width of the glass ribbon 22. With this in mind, the bending tool(s) can be supported relative to the conveyor device 70 by framework (not shown) or other structures that permit vertical and/or horizontal adjustment. In related embodiments, an appropriate actuator (e.g., pneumatic, mechanical, electronic, etc.) can be linked or connected to the bending tool, with operation of the actuator controlled by a controller (e.g., PLC). With these and other embodiments, a position of one or more of the bending tools can be automatically adjusted prior to or during a glass ribbon production operation. For example, conditions during initial start-up of the system 20 (e.g., heat-up and glass ribbon initiation or threading) may not be compatible with the bending tool locations otherwise desired during normal production; under these and other circumstances, automated repositioning of one or more of the bending tools can be provided. Similarly, different glass ribbon properties and/or production requirements may implicate different bending tool locations; automated repositioning (e.g., for example in response to operator entered production constraints) of one or more of the bending tools can be provided.

Figure 4:
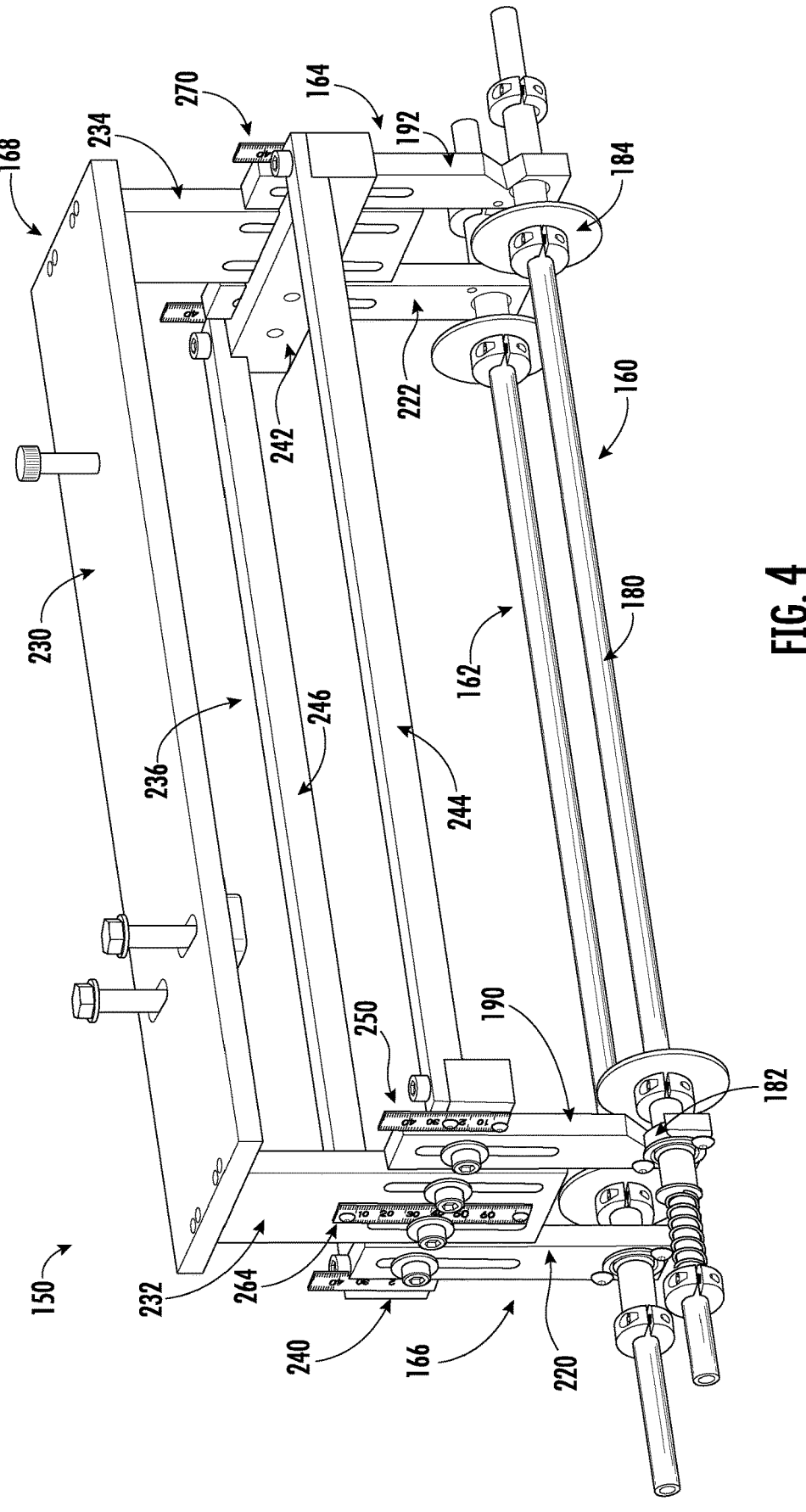
FIG. 4 is a perspective view of a bending tool assembly in accordance with principles of the present disclosure and useful with glass ribbon floor conveying units of the present disclosure.

An exemplary bending tool assembly 150 in accordance with principles of the present disclosure and useful with the floor conveying units of the present disclosure, such as the floor conveying unit 32 (FIG. 1), is shown in FIG. 4. The bending tool assembly 150 includes an upstream bending tool 160, a downstream bending tool 162, an upstream support unit 164 (referenced generally), a downstream support unit 166 (referenced generally), and a base unit 168. Details on the various components are provided below. In general terms, the bending tool assembly 150 can be mounted relative to a conveyor device, such as the conveyor device 70 (FIG. 1) described above, locating the bending tools 160, 162 upstream of a pulling device, such as the pulling device 72 (FIG. 1). The bending tools 160, 162 are configured and located to interface with a continuously conveyed glass ribbon (not shown) in a manner that decreases warp or improves flatness. The upstream support unit 164 retains the upstream bending tool 160 relative to the base unit 168, and in some embodiments permits selective positioning of the upstream bending tool 160 relative to the conveyor device, and in particular relative a primary plane of travel (such as the primary plane of travel P (FIG. 1) described above) of the conveyor device. The downstream support unit 164 similarly retains the downstream bending tool 162 in some embodiments.

The bending tools 160, 162 can each assume any of the forms described throughout this disclosure, and in some embodiments are or include a cylindrical rod 180 (identified for the upstream bending tool 160). One or both of the bending tools 160, 162 can comprise a roller, incorporating rolling features (e.g., bearings 182, one of which is identified in FIG. 4) that provide rotation of the rod 180 about a central axis thereof (upon mounting to the corresponding upstream support unit 164 and downstream support unit 166 as described below). Optionally, one or both of the bending tools 160, 162 can further include heat shield(s) 184 (one of which is identified in FIG. 4) mounted to the rod 180 and configured to protect a corresponding one of the rolling features (e.g., one of the bearings 182) from heat radiating from a glass ribbon (not shown). One or both of the bending tools 160, 162 can have other constructions that may or may not be illustrated by FIG. 4, and may or may not have a roller-type format.

Figure 5:
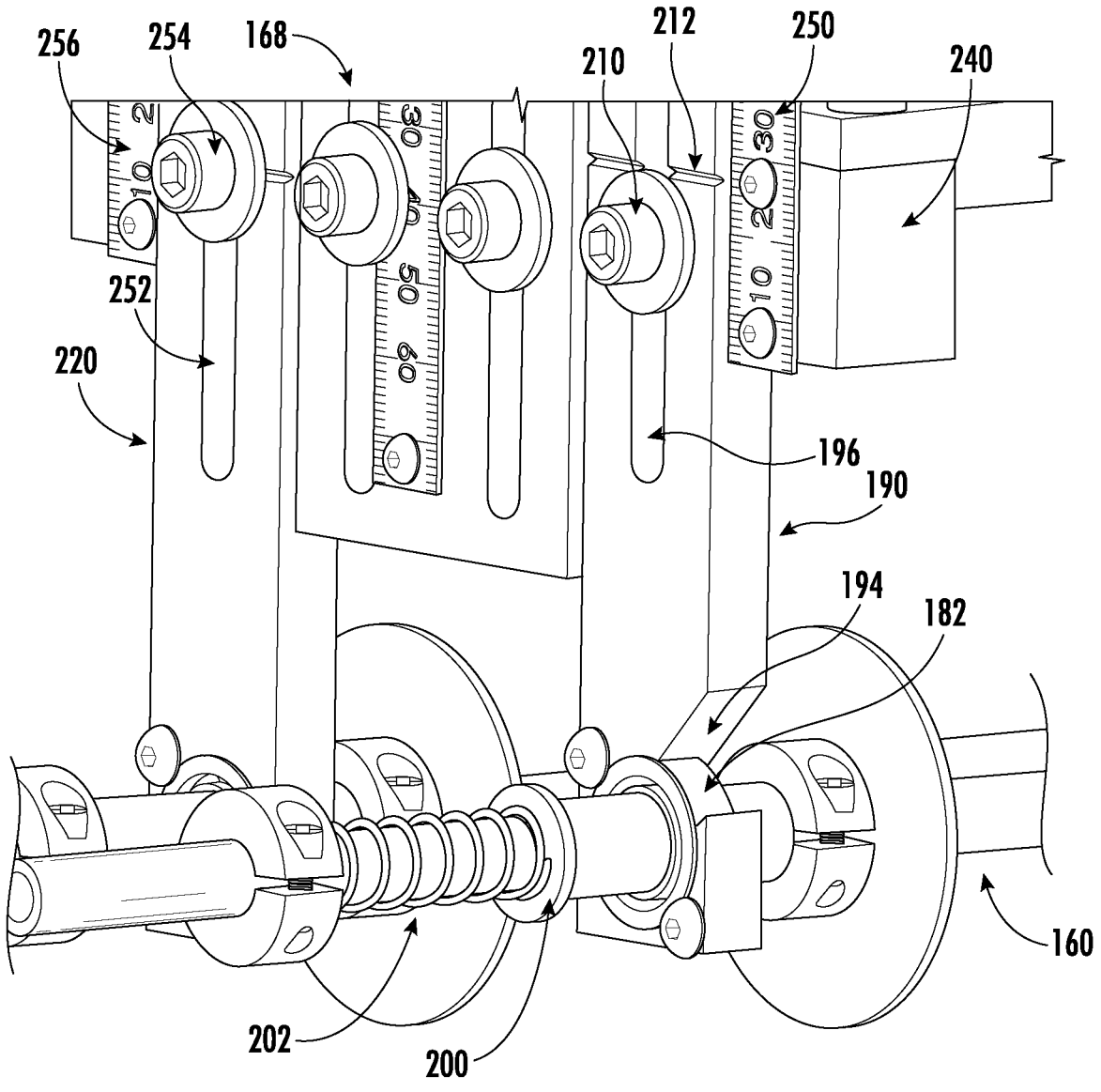
FIG. 5 is an enlarged side perspective view of a portion of the bending tool assembly of FIG. 4.

The upstream support unit 164 includes opposing, first and second upstream support bodies 190, 192. The upstream support bodies 190, 192 can be identical in some embodiments, and are each generally configured to support an end region of the upstream bending tool 160 (e.g., the cylindrical rod 180 of the upstream bending tool 160), and to establish a spatial position of the upstream bending tool 160 relative to the base unit 168. FIG. 5 illustrates a portion of the first upstream support body 190 in greater detail. The upstream support body 190 forms or defines a tool receiving slot 194 and a guide slot 196. A size and shape of the tool receiving slot 194 corresponds with features of the upstream bending tool 160 to permit selective assembly or mounting of the upstream bending tool 160 to the upstream support body 190. For example, a size and shape of the tool receiving slot 194 can correspond with a size and shape of the bearing 182 carried by the rod 180, such that the bearing 182 nests within the slot 194 in the mounted state of FIG. 5. Further, the upstream bending tool 160 can include one or more additional components that selectively hold or lock the bearing 182 relative to the support body 190 in the mounted state, such as a collar 200 and a spring 202 or similar component that biases the collar 200 into engagement with the support body 190. With this construction, the upstream bending tool 160 can be selectively secured to, and removed from, the first upstream support body 190 (as well as the second upstream support body 192 (FIG. 4)). Other mounting constructions are also acceptable, and may or may not provide for removable assembly of the upstream bending tool 160 to the upstream support unit 164 (FIG. 4).

The guide slot 196 is included in some optional embodiments, and is generally configured to facilitate a moveable connection between the first upstream support body 190 and the base unit 168. For example, in some embodiments, the guide slot 196 is sized and shaped to slidably receive a fastener 210 included with the base unit 168. With this optional construction, the fastener 210 can be loosened to permit raising or lower of the support body 190 (and thus of the upstream bending tool 160 carried there by) relative to the base unit 168; once the support body 190 is at a desired vertical position, the fastener 210 can then be tightened to secure the support body 190 relative to the base unit 168. In this regard, the support body 190 can form or carry an indicator 212 (e.g., a groove) that serves to correlate or identify a vertical position of the support body 190 relative to a scale or other indicia included with the base unit 168 as described in greater detail below. The first upstream support body 190 (and the base unit 168) can incorporate other mounting configurations that may or may not include the guide slot 196.

Returning to FIG. 4, the downstream support unit 166 can be constructed similar to, such as identical to, the upstream support unit 164 as described above including, for example, opposing first and second downstream support bodies 220, 222. In some embodiments, the downstream support bodies 220, 222 are configured to establish a more permanent connection or assembly of the downstream bending tool 162. For example, in some embodiments, the downstream bending tool 162 may not be readily removable from the downstream support unit 166.

The base unit 168 can include a plate 230, opposing first and second side legs 232, 234, and framework 236 (referenced generally). The side legs 232, 234 can be identical in size and shape, and are attached to and project from opposite ends of the plate 230. The framework 236 includes opposing first and second cross-beams 240, 242, and optional opposing first and second arms 244, 246. The cross-beams 240, 242 are movably connected to a corresponding one of the side legs 232, 234, and to a corresponding one of the support bodies 190, 192 or 220, 222 included with the upstream and downstream support units 164, 166. The arms 244, 246 extend between and interconnect the cross-beams 240, 242. With this construction, the plate 230 provides a robust structure for installing the bending tool assembly 150 relative to a floor conveying unit such that the plate 230 and the legs 232, 234 are held stationary. Each of the cross-beams 240, 242 can be selectively moved relative to the corresponding leg 232, 234 to collectively raise or lower a corresponding end of the upstream and downstream support units 164, 166 (and thus an end of the corresponding upstream and downstream bending tool 160, 162 carried thereby) relative to the plate 230. Further, an end of each of the upstream and downstream bending tools 160, 162 can be individually raised or lowered relative to plate 230 via movement of the corresponding support body 190, 192, 220, 222 relative to the corresponding cross-beam 240, 242.

Figure 6A:
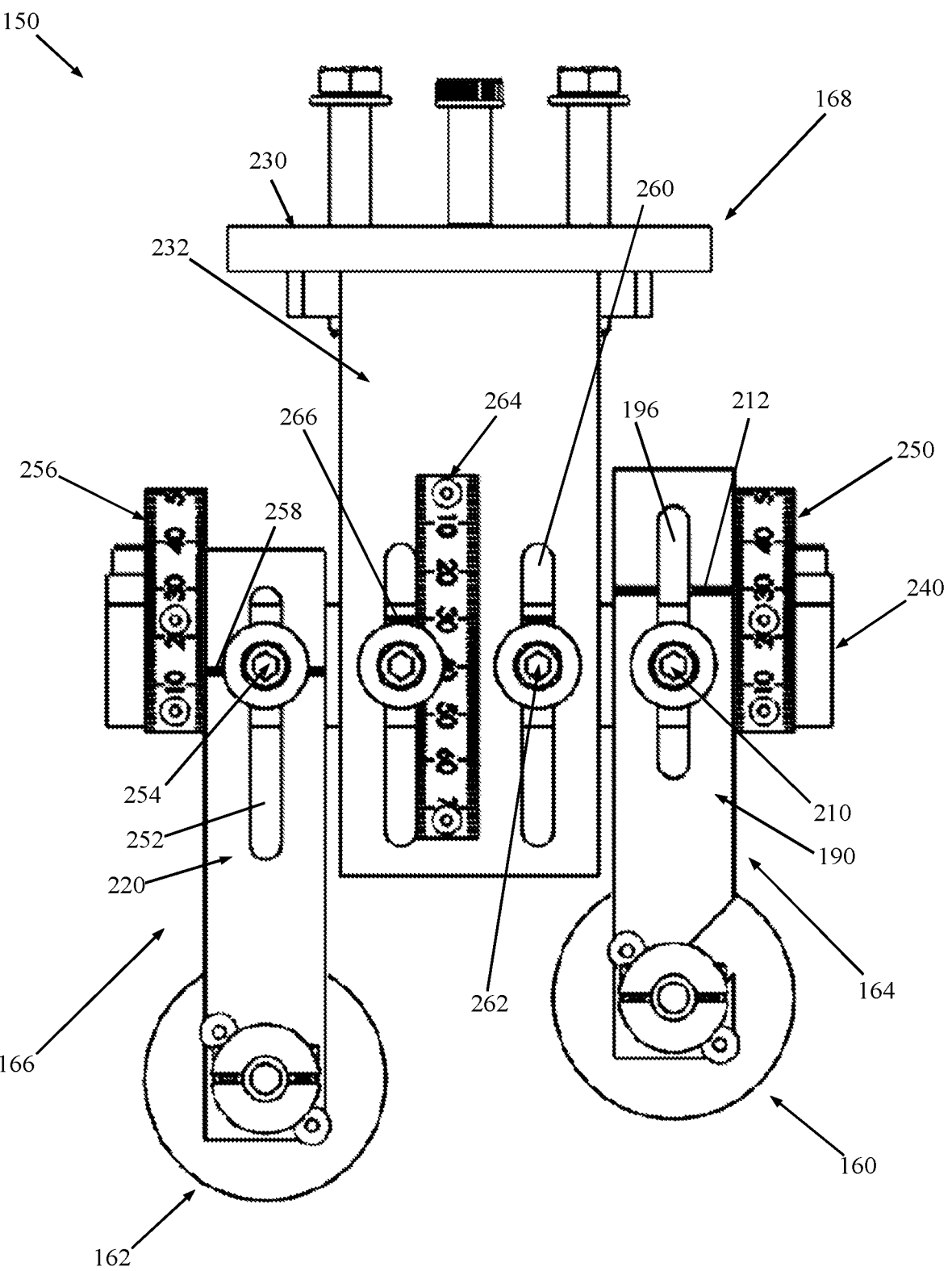
FIG. 6A is a side view of the bending tool assembly of FIG. 4.
Figure 6B:
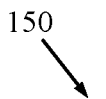
FIG. 6B is another side view of the bending tool assembly and illustrating upstream and downstream bending tools in positions differing from the positions of the FIG. 6A.

Interconnection between the support units 164, 166 and the base unit 168 is further illustrated in FIG. 6A. The first upstream support body 190 is selectively coupled to the first cross-beam 240 by the fastener 210 (that otherwise is slidably received within the guide slot 196) such that the first upstream support body 190 (and thus the end of the upstream bending tool 160 carried thereby) can be raised and lowered relative to the first cross-beam 240. An upstream scale or measurement tool 250 can be affixed to the first cross-beam 240 proximate the first upstream support body 190 and can include incremented designations (e.g., numbers, hash marks, etc.). A relationship between the indicator 212 of the first upstream support body 190 and the designations included on the scale 250 can indicate a vertical position of the end of the upstream bending tool 160 carried by the first upstream support body 190 relative to the first cross-beam 240 and/or relative to the plate 230. For example, in the arrangement of FIG. 6B, the first upstream support body 190 has been vertically raised (as compared to the position of FIG. 6A) relative to the first cross-beam 240. This change in position can be visually indicated to a user by the indicator 212 and the scale 250; in the position of FIG. 6A, the indicator 212 aligns with a first designation along the scale 250 (i.e., "30"), whereas in the position of FIG. 6B, the indicator 212 aligns with a different designation along the scale 250 (i.e., at a designation between "30" and "40";

approximately "38"). Other scalar-type identification schemes can alternatively be used.

With reference between FIGS. 5 and 6A, the first downstream support body 220 can similarly define a guide slot 252, and can be selectively coupled to the first cross-beam 240 by a fastener 254 slidably received within the guide slot 252. Thus, the first downstream support body 220 (and the end of the downstream bending tool 162 carried thereby) can be raised or lowered relative to the first cross-beam 240. A downstream scale or measurement tool 256 can be affixed to the first cross-beam 240 proximate the first downstream support body 220; a relationship between an indicator 258 formed on or carried by the first downstream support body 220 relative to measurement-related information included on the downstream scale 256 can indicate a vertical position of the end of the downstream bending tool 162 carried by the first downstream support body 220 relative to the first cross-beam 240 and/or relative to the plate 230. For example, a comparison of FIGS. 6A and 6B reveals that in the arrangement of FIG. 6B, the first downstream support body 220 has been vertically lowered (as compared to the position of FIG. 6A) relative to the first cross-beam 240. This change in position can be indicated to a user by the indicator 258 and the downstream scale 256; in the position of FIG. 6A, the indicator 258 aligns with a first designation along the downstream scale 256 (i.e., between "10" and "20"; approximately "13"), whereas in the position of FIG. 6B, the indicator 258 aligns with a different designation along the downstream scale 256 (i.e., at a designation below "10"; approximately "8").

In some embodiments, the upstream scale 250 and the downstream scale 256 can carry or display identical measurement-related designators, and may be horizontally aligned relative to one another along the first cross-beam 240. For example, as shown in FIG. 6A, the designator "30" on the upstream scale 250 can be horizontally aligned with the designator "30" on the downstream scale 256. With this optional configuration, a user can more readily understand and select a desired vertical spacing between the upstream and downstream bending tools 160, 162. For example, where the scales 250, 256 have designators incremented in millimeters and a user desires to 20 mm vertical spacing between the upstream and downstream bending tools 160, 162, the indicator 212 of the first upstream support body 190 can be aligned with the "30" on the upstream scale 250, and the indicator 258 can be aligned with the "10" on the downstream scale 256.

In some embodiments, the first cross-beam 240 can be selectively coupled to the first side leg 232. For example, the first side leg 232 can form one or more guide slots 260 each sized to slidably receive a fastener 262 that in turn is attached to the first cross-beam 240. With this exemplary construction, the first cross-beam 240, and thus the upstream and downstream bending tools 160, 162 via the support bodies 190, 220, can be raised and lowered relative to the first side leg 232, and thus relative to the plate 230. A midstream scale or measurement tool 264 can be affixed to the first side leg 232 proximate one of the guide slots 260; a relationship between an indicator 266 formed on or carried by the first cross-beam 240 relative to measurement-related information included on the scale 264 can indicate a vertical position of the first cross-beam 240 (and thus of the bending tools 160, 162) relative to the plate 230.

Returning to FIG. 4, the second upstream support body 192 and the second downstream support body 222 can be selectively coupled to the second cross-beam 242 commensurate with the descriptions above. With these optional assembly configurations, the first bending tool 160 can be vertically raised and lowered relative to the plate 230 via selected movement of the first and second upstream support bodies 190, 192 relative to the corresponding cross-beam 240, 242. In some embodiments, the second upstream support body 192 includes or carries an indicator (hidden) similar to or identical to the indicator 212 (FIG. 5) of the first upstream support body 190, and the second cross-beam 242 includes or carries an upstream scale 270 similar to or identical to the upstream scale 250 as described above. A vertical location of the second upstream support body indicator along the second upstream support body 192 can be similar to or identical to that of the indicator 212 along the first upstream support body 190; incremented designators along the upstream scale 270 included with the second cross-beam 242 can be similar to or identical to those of the upstream scale 250 included with the first cross-beam 240, and a vertical location of the upstream scale 270 on the second cross-beam 242 can be similar to or identical to that of the upstream scale 250 on the first cross-beam 240. With these optional construction, a user is provided with a visual indication as to a vertical position of the opposing ends of the upstream bending tool 160 as dictated by the upstream support bodies 190, 192. For example, if a user desires to arrange the upstream bending tool 160 such that the central axis of the rod 180 is substantially horizontal and assuming the plate 230 is horizontally mounted, the first and second upstream support bodies 190, 192 are arranged relative to the corresponding cross-beam 240, 242 such that the indicator 212 of the first upstream support body 190 and the indicator of the second support body 192 can be aligned with the same incremented designator included with the corresponding upstream scale 250, 270. Additionally, a user can establish a known deviation from horizontal by arranging the first and second upstream support bodies 190, 192 at selected, differing vertical locations relative to the corresponding upstream scale 250, 270. Similar or identical alignment features can optionally be included in the downstream support unit 166.

In some embodiments, the second cross-beam 242 can be selectively coupled to the second side leg 234 commensurate with the descriptions above with respect to selective coupling between the first cross-beam 240 and the first side leg 232. Further, the second cross-beam 242 can include or carry an indicator (hidden) similar to or identical to the indicator 266 (FIG. 7A) of the first cross-beam 240, and the second side leg 234 can include or carry a midstream scale (hidden) identical to the midstream scale 264 associated with the first side leg 232. With these optional constructions, the upstream and downstream bending tools 160, 162 can be collectively vertically raised and lowered relative to the plate 230 by raising or lowering the framework 236 relative to the side legs 232, 234. The arms 244, 246, where included, can serve as handles for manipulate the framework 236 as a whole. Regardless, a user can be provided with a visual indication of vertical alignment of the cross-beams 240, 242 relative to the corresponding side leg 232, 234 via the indicator of each cross-beam 240, 242 (e.g., the indicator 266 of the first cross-beam 240) relative to the corresponding midstream scale associated with the corresponding side leg 232, 234 (e.g., the midstream scale 264 of the first side leg 232). Other mounting configurations that may or may not facilitate collective vertical movement of the upstream and downstream bending tools 160, 162 are also acceptable.

The bending tool assembly 150 can optionally include one or more additional components or features. For example, in some embodiments the bending tool assembly 150 can be automated or mechanized, with one or more of the adjustments or measurements described above being made remotely through a controller (e.g. programmable logic controller) or computer interface.

Figure 7:
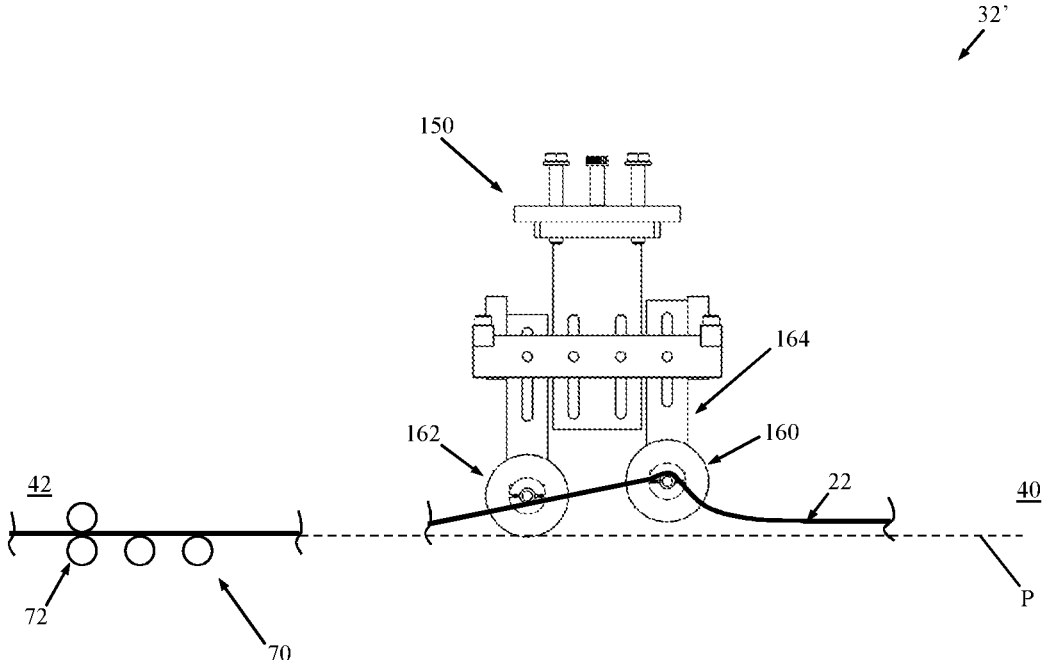
FIG. 7 is a simplified side view of another floor conveying unit in accordance with principles of the present disclosure processing a glass ribbon, and including the bending tool assembly of FIG. 4.

FIG. 7 illustrates, in simplified form, one example of a conveying apparatus 32' processing the glass ribbon 22 in accordance with principles of the present disclosure. The conveying apparatus 32' includes the conveyor device 70 and the pulling device 72 as described above, along with the bending tool assembly 150. Commensurate with previous explanations, the conveyor device 70 establishes the primary plane of travel P from the upstream side 40 to the downstream side 42. The bending tool assembly 150 is arranged between the upstream side 40 and the downstream side 42, with the upstream bending tool 160 being upstream of the downstream bending tool 162. The bending tool assembly 150 establishes a travel path that deviates from the primary plane of travel P, including the glass ribbon 22 traveling over (and in contact with) the upstream bending tool 160 and under (and in contact with) the downstream bending tool 162. As the glass ribbon 22 is caused to bend at the upstream bending tool 160, the corresponding bending stress effectuates warp removal as described above. In some embodiments, the upstream and downstream bending tools 160, 162 are located to interface with the glass ribbon 22 at a point where the glass ribbon 22 is expected to have a higher viscosity (e.g., an expected viscosity of the glass ribbon 22 at the point of interface with the upstream bending tool 160 is greater than would otherwise be necessary for the glass ribbon 22 to bend about the upstream bending tool 160 solely due to gravity). As a point of reference, threading of the glass ribbon 22 to the conveying apparatus 30' can include removing the upstream bending tool 160 from the upstream support unit 164, threading the glass ribbon 22 through the conveying apparatus 30', and then installing the upstream bending tool 160 to the upstream support unit 164 (arriving at the travel path of FIG. 7). In other embodiments, the upstream bending tool 160 can be more permanently installed to the upstream support unit 164.

Returning to FIG. 1, the systems, conveying apparatuses and methods of the present disclosure can incorporate one or more additional features that aid in the reduction of warp. For example, the conveyor device 70 can include a table or plate having a flat surface projecting from the upstream side 40 in the primary plane of travel P and intended to provide desired heat transfer with the glass ribbon 22. In some embodiments, the conveying apparatus 32 can include one or more suspension rods or similar structures (e.g., graphite rods) located to prevent the glass ribbon 22 from contacting the flat surface of the table. It has surprisingly been found that by avoiding contact between the traveling glass ribbon 22 and an elongated flat surface reduces occurrences of macro longitudinal waves (e.g., deviations in flatness of greater than 3 mm extending lengthwise in the glass ribbon 22) that likely result from lengthy contact with a cold surface. In related embodiments, the support or air table can be formed of a Zircar ceramic (instead of graphite) to provide low emissivity and low thermal conductivity properties. Alternatively or in addition, warp at edges of the glass ribbon 22 can be reduced by reverse bending the glass ribbon 22 over rods arranged perpendicular to the glass ribbon travel path, providing suspension rods adjacent the upstream side 40 with a catenary that drives bending and flattening of the glass ribbon 22, and/or providing one or more additional nip/flattening rolls that provide roll-on-roll line contact to generate a high local bending pressure.

Embodiments and advantages of features of the present disclosure are further illustrated by the following non-limiting examples, but the particular materials and amounts thereof recited in these examples, as well as other conditions and details, should not be construed to unduly limit the scope of the present disclosure.

EXAMPLE

Figure 8:
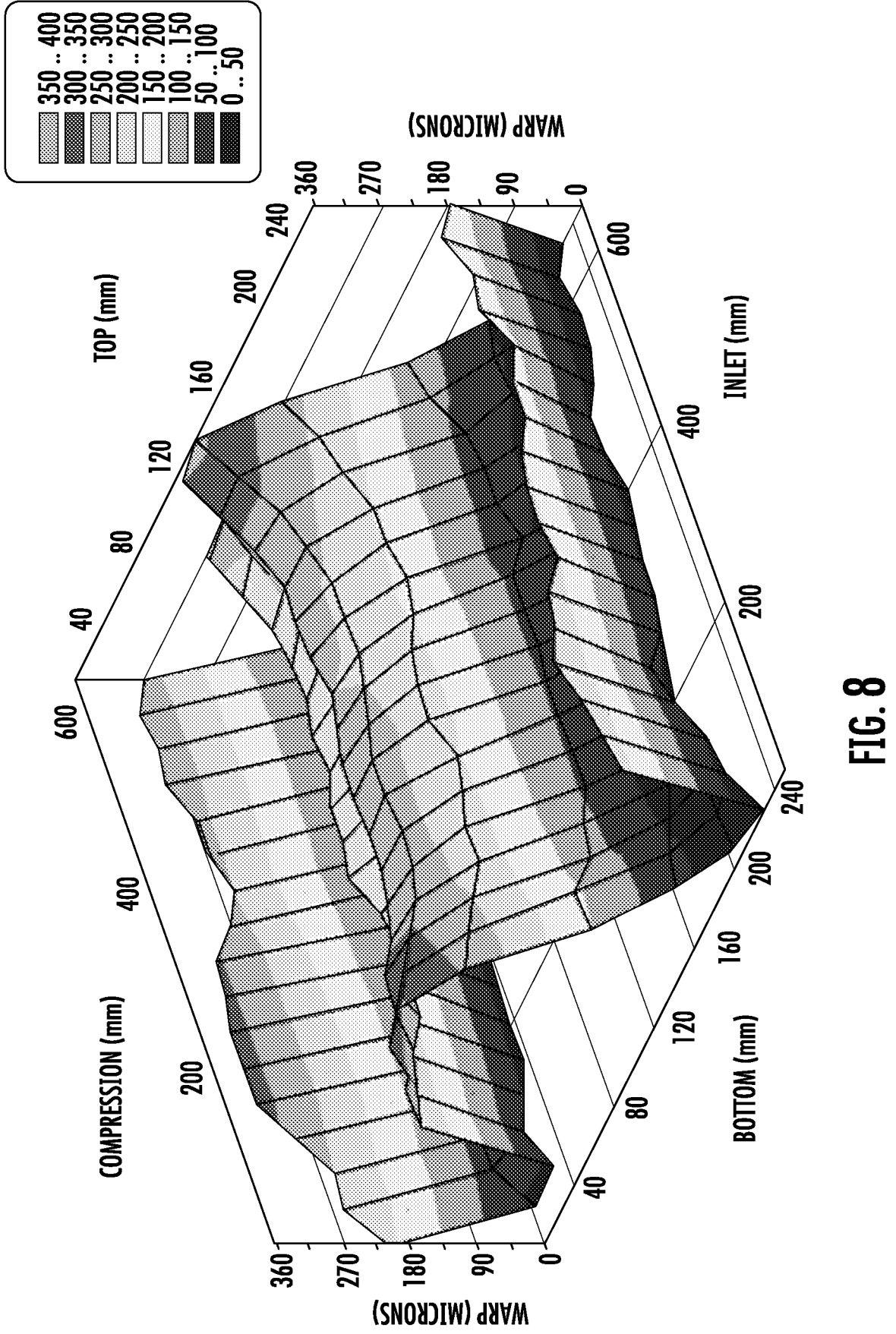
FIG. 8 is a graph of measured warp in a comparative sample glass sheet of the Example section.

A comparative sample glass sheet was prepared using a conventional fusion draw method production system including a conveying apparatus receiving a continuous glass ribbon from a down draw fusion supply apparatus. The conveying apparatus included a nip roller at a downstream end thereof, and conveyed the glass ribbon in a primary plane of travel from an upstream end to a downstream end. The glass ribbon was subjected to a 90 degree turn (vertical to horizontal) from the fusion supply apparatus to the conveying apparatus, and was allowed to cool while traversing the conveying apparatus. Following cooling, the comparative sample glass sheet was cut from the glass ribbon; the comparative sample glass sheet had a width of 250 mm and a length of 650 mm. Warp in the comparative sample glass sheet was then measured, and is presented in FIG. 8. The range of deviation in flatness exhibited by the comparative sample glass sheet was found to be greater than 300 micrometers.

Figure 9:
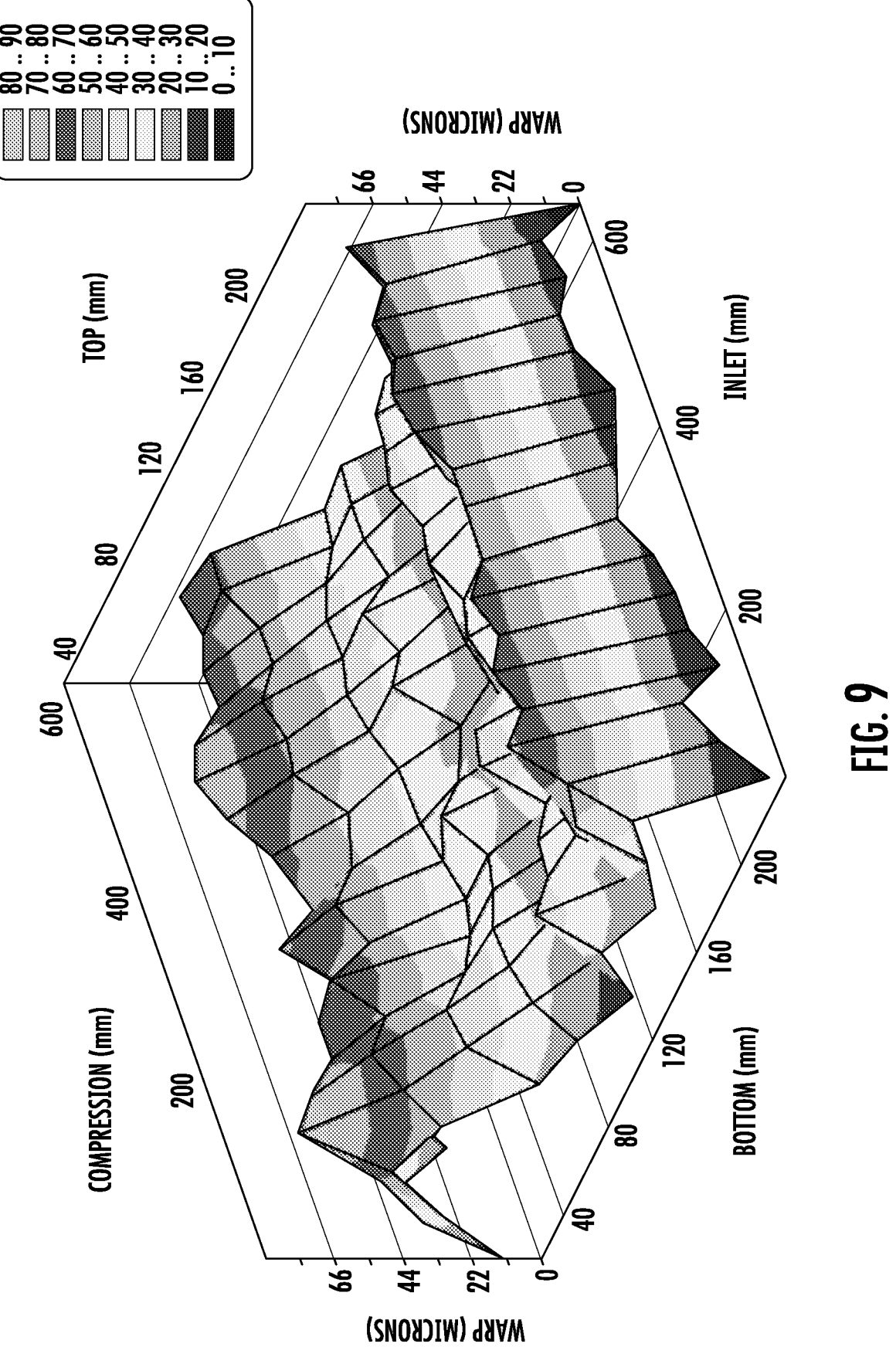
FIG. 9 is a graph of measured warp in an example glass sheet of the Example section.

An example glass sheet was prepared using the same glass formulations employed for the comparative sample glass sheet as above. The fusion supply apparatus utilized in preparing the comparative sample glass sheet was also employed as was the conveying apparatus, except that bending tools were incorporated into the conveying apparatus similar to the arrangement of FIG. 1, subjecting the glass ribbon to a series of bends. Following cooling, the example glass sheet was cut from the glass ribbon; the sample glass sheet had a width of 250 mm and a length of 650 mm. Warp in the example glass sheet was then measured, and is presented in FIG. 9. The range of deviation in flatness exhibited by the example glass sheet was found to be less than 100 micrometers. A comparison of FIGS. 8 and 9 reveals that with all other parameters being equal, flatness is improved with the conveying apparatuses, systems and methods of the present disclosure.

The glass ribbon processing systems, conveying apparatuses, and methods of the present disclosure provide a marked improvement over previous designs and techniques. Some systems, apparatuses and methods of the present disclosure provide for warp reduction in a continuously conveyed glass ribbon through a succession of one or more bends at different viscosities. The upward force component(s) for forming the bend(s) can be provided by a physical means that drives the glass ribbon to a higher position as compare to the normal plane of travel. This physical means can be a solid surface, static or in rotation, with or without air bearing, leading to an interaction that can be friction, rolling or non-contact. The downward force component(s) for forming the bends can be provided by gravity when viscosity is sufficiently low, or by the use of a mechanical means that forces the glass ribbon to a lower position. The glass ribbon bending generates a stress field that tends to flatten the profile of the glass ribbon across the width.

Various modifications and variations can be made the embodiments described herein without departing from the scope of the claimed subject matter. Thus it is intended that the specification cover the modifications and variations of the various embodiments described herein provided such modifications and variations come within the scope of the appended claims and their equivalents.

What is claimed is:

1. A system for processing a continuous glass ribbon, the system comprising:
   a conveying apparatus comprising:
   a conveyor device establishing a primary plane of travel from an upstream side to a downstream side opposite the upstream side,
   a pulling device located at the downstream side, the pulling device configured to convey the continuous glass ribbon along a travel path with a first major surface of the continuous glass ribbon facing a downward direction toward the primary plane of travel, and a second major surface of the continuous glass ribbon facing an upward direction away from the primary plane of travel,
   a first bending tool proximate the upstream side, the first bending tool configured to establish a first bend of the travel path defining a curve that is convex in the upward direction, wherein the first bending tool is configured to interface with the continuous glass ribbon to cause, at least in part, the first bend at a first location of the travel path between the upstream side and the pulling device where the viscosity of the continuous glass ribbon is not greater than $1 \times 10^8$ Poise,
   a second bending tool between the first bending tool and the downstream side, wherein a vertical distance between the second bending tool and the primary plane of travel is greater than a vertical distance between the first bending tool and the primary plane of travel, wherein the second bending tool is configured to establish a second bend of the travel path defining a curve that is concave in the upward direction, wherein the second bending tool is configured to interface with the continuous glass ribbon to cause, at least in part, the second bend at a second location between the first location and the pulling device, and
   a third bending tool between the second bending tool and the downstream side, wherein a vertical distance between the third bending tool and the primary plane of travel is greater than the vertical distance between the second bending tool and the primary plane of travel, wherein the third bending tool is configured to establish a third bend of the travel path defining a curve that is convex in the upward direction, wherein the third bending tool is configured to interface with the continuous glass ribbon to cause, at least in part, the third bend at a third location between the interface of the second bending tool with the continuous glass ribbon and the interface of the third bending tool with the continuous glass ribbon where the viscosity of the continuous glass ribbon is not less than $1 \times 10^8$ Poise, wherein the glass ribbon is configured to not interface with any bending tool along the travel path between the second bending tool and the third bending tool,
   wherein the primary plane of travel extends from a location downstream of the third location and to the pulling device.

2. The system of claim 1, wherein the first bending tool, the second bending tool, and the third bending tool are each configured to establish a line of contact with the continuous glass ribbon being conveyed along the travel path.

3. The system of claim 1, wherein a horizontal distance between the first bending tool and the second bending tool is greater than a horizontal distance between the second bending tool and the third bending tool.

4. The system of claim 1, wherein at least one of the first bending tool, the second bending tool, and the third bending tool is static.

5. The system of claim 1, wherein the first bending tool is only configured to interface with first major surface of the continuous glass ribbon that faces the downward direction toward the primary plane of travel.

6. The system of claim 5, wherein the second bending tool is only configured to interface with first major surface of the continuous glass ribbon that faces the downward direction toward the primary plane of travel.

7. The system of claim 6, wherein the third bending tool is only configured to interface with second major surface of the continuous glass ribbon that faces the upward direction away from the primary plane of travel.

8. The system of claim 5, wherein the third bending tool is only configured to interface with second major surface of the continuous glass ribbon that faces the upward direction away from the primary plane of travel.

9. The system of claim 1, wherein the second bending tool is only configured to interface with first major surface of the continuous glass ribbon that faces the downward direction toward the primary plane of travel.

10. The system of claim 9, wherein the third bending tool is only configured to interface with second major surface of the continuous glass ribbon that faces the upward direction away from the primary plane of travel.

11. The system of claim 1, wherein the third bending tool is only configured to interface with second major surface of the continuous glass ribbon that faces the upward direction away from the primary plane of travel.

12. The system of claim 1, wherein the second bending tool is further configured to interface with the continuous glass ribbon to cause, at least in part, the second bend at the second location further positioned between the interface of the first bending tool with the continuous glass ribbon and the interface of the second bending tool with the continuous glass ribbon.

* * * * *